Dec. 10, 1940.                J. B. BARTOW                    2,224,775
      METHOD FOR OBTAINING INCREASED THIRD DIMENSIONAL VIEWING OF
               OBJECTS FROM A TRAVELING CRAFT OR VEHICLE
                          Filed Oct. 28, 1938

Inventor:—
John B. Bartow
By his Attorneys
Howson & Howson

Patented Dec. 10, 1940

2,224,775

UNITED STATES PATENT OFFICE 2,224,775

METHOD FOR OBTAINING INCREASED THIRD DIMENSIONAL VIEWING OF OBJECTS FROM A TRAVELING CRAFT OR VEHICLE

John B. Bartow, Blue Bell, Pa., assignor to Bartow Beacons, Inc., Philadelphia, Pa., a corporation of Pennsylvania Application October 28, 1938, Serial No. 237,568

3 Claims. (Cl. 88—1)

This invention relates to a novel method for obtaining increased third dimension or relief effect when viewing objects from a traveling craft or vehicle when the line of travel of the craft or vehicle is disposed at an angle to the line of vision between an observer on the craft or vehicle and the objects.

As is well known, the eyes are incapable of obtaining any substantial degree of visual relief effect when viewing an object from a great distance. Generally speaking, good visual relief is obtained by the eyes up to a distance of about 500 feet from an object; but when the eyes are placed at greater distances from the object, very little, if any, relief effect is obtained. For this reason, an object viewed by the eyes from a great distance appears two-dimensional rather than three-dimensional.

The present invention has for its principal object the provision of a simple method for enabling an observer on a traveling craft or vehicle to obtain good visual relief of an object from a great distance when the line of travel of said craft or vehicle is disposed at an angle to the line of vision between the observer and said object. The invention is particularly useful to the pilot of an aircraft, for it enables him to obtain a three-dimensional view of a distant object which would otherwise be visible only as a two-dimensional object. Thus, the pilot of an aircraft traveling at a high altitude and in a direction other than directly toward a ground object, may obtain a good three dimensional or relief view of said object. Of course, the invention is not limited to use by a pilot, but is useful also to other persons, such as passengers on the aircraft.

The invention achieves its object by causing the respective eyes of an observer on a traveling craft or vehicle whose line of travel is not directly toward a distant object to be viewed, to view said object alternately and successively at a frequency within the persistence of vision of the human eye, the travel of the craft with respect to the object causing the observer's eyes to view the said object alternately and successively from points of observation spaced a substantial distance apart, so that the observer obtains a three-dimensional view of the object. Thus, according to the invention, advantage is taken of the motion of the craft when traveling in a direction other than directly toward a distant object to be viewed, as well as certain novel viewing means, to effect third-dimensional viewing of said object by the observer's eyes from widely spaced points of observation. The means for effecting third-dimensional viewing of the object preferably takes the form of an apertured opaque disk which is rotated at a speed such that the successive and alternate viewings by the observer's eyes take place at a frequency within the persistence of vision, but the invention is not thus limited as will be more clearly seen later.

The invention may be clearly understood by reference to the accompanying drawing illustrating certain preferred forms thereof.

Figure 1:
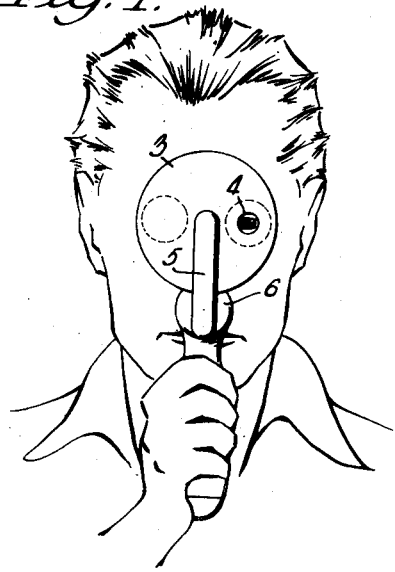
Figures 1 and 2 are front and side views, respectively, of a portable apparatus constructed according to the invention, the views illustrating the use of such apparatus by an observer.
Figure 2:
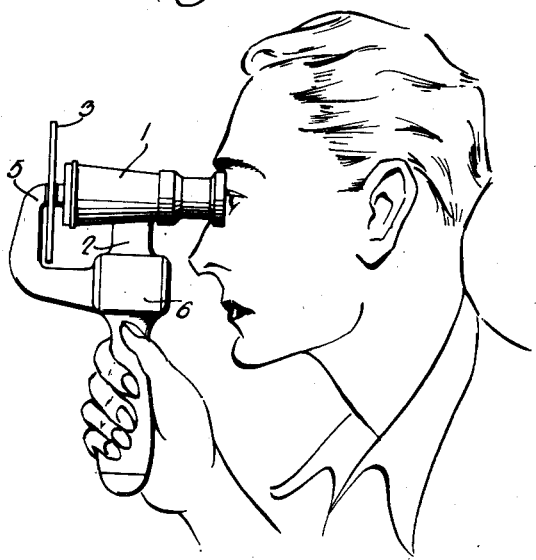

Referring to Figs. 1 and 2, the portable device illustrated comprises a pair of binoculars 1, supported by the handle structure 2. Adjacent the outer ends of the eye-pieces, there is provided a rotatable opaque disk 3 having an aperture 4 therein which is so located that it aligns alternately and successively with the eye-pieces as the disk is rotated. The disk is rotatably supported by a hollow support 5 extending from the handle structure 2. A small motor (not visible) within the housing or casing 6 serves as the motivating means for the disk, and the driving connection between the motor and disk may take the form of a flexible shaft extending through the hollow support 5. This method of driving a rotatable element is so well known that it is deemed unnecessary to illustrate the details thereof. Since the disk is small, usually being about five inches in diameter, and it may be made of light material such as aluminum, very little power is required to drive it, and, therefore, a miniature motor is sufficient for the purpose. If desired, the motor may be energized by small dry cell batteries carried within the handle structure 2.

The disk 3 is rotated at a speed such that successive complete viewings of the object take place at a frequency within the persistence of vision of the human eye, that is, 16 or more cycles per second. Now when such a device is employed to view a distant object from a craft or vehicle which is traveling in a direction other than directly toward said object, the travel of the craft serves, in conjunction with the viewing device, to greatly increase the third-dimensional effect.

Figure 5:
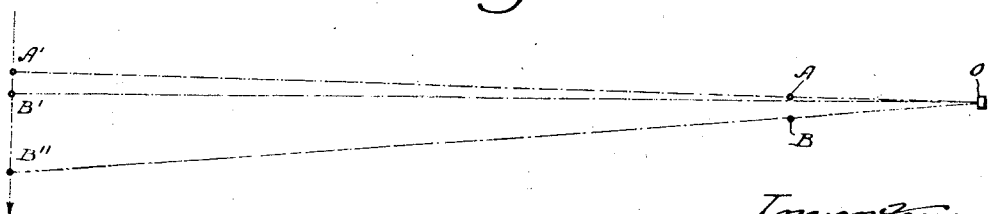
Fig. 5 is an explanatory illustration by means of which the principles of the invention may be more clearly understood.

This may be readily seen by referring to Fig. 5 wherein an object to be viewed is indicated at O. Suppose that the two eyes of an observer view the object simultaneously from a position A—B about 500 feet from the object, the points A and B representing the respective eyes of the observer. Of course, the distance between the eyes as represented by A and B is greatly exaggerated in relation to the distance from the object, this being necessary for illustration within a small space. The angle of vision is AOB. Now suppose that the observer's eyes are positioned at A'—B' and again view the object simultaneously, the points A' and B' representing the eyes. According to the approximate scale of the figure, the position A'—B' is about 2500 feet from the object. The angle of vision A'OB' is much smaller than that obtaining at 500 feet and the third-dimension effect or relief is quite poor. If it were possible, however, to separate the observer's eyes so as to locate them at points A' and B'' (which are on extensions of lines OA and OB respectively), the observer would obtain at 2500 feet the same third-dimension effect as he would at 500 feet, since the angle A'OB'' is equal to the angle AOB, and the distance A'B'' bears the same relation to AB as the corresponding distances from the object bear to one another.

Now suppose that the observer views the object with the device of Figs. 1 and 2 from a craft or vehicle traveling in the direction of the broken line arrow, and that the rotating disk is revolving at a speed of 16 or more revolutions per second. If the speed of the craft is such that one eye views the object at points A' and the other eye views the object at point B'', the effect is the same as though the eyes were spaced apart the distance A'B'', giving the observer on the traveling craft or vehicle the same third-dimension effect as he would obtain at 500 feet with the naked eyes viewing the object simultaneously. Thus the third-dimension effect would be increased in the ratio between the distance A'B'' and the distance between the eyes.

Taking a more specific example, suppose that an air-craft is traveling in the direction of the broken line arrow of Fig. 5 at a speed of 180 miles per hour, and that the disk 3 of the device of Figs. 1 and 2 is rotating at a speed of 16 revolutions per second before the eyes of an observer on the aircraft. From these figures, it may be readily calculated that the aircraft will travel approximately 16 feet during each revolution of the disk, and if the eye-pieces are 180° apart with respect to the center of the disk, as in Figs. 1 and 2, the craft will travel approximately eight feet during the interval between successive viewings of the object by the two eyes. Now, since the distance between the eyes is approximately two and one-half inches, the third-dimensional viewing of the observer is increased by the invention in a ratio of approximately 40 to 1. In other words, the invention obtains the same third-dimension effect that would be obtained if it were possible to separate the observer's eyes by a distance of approximately eight feet instead of two and one-half inches. Since the alternate and successive viewings of the object take place at a frequency within the persistence of vision, the observer obtains a good third-dimensonal view of the object.

Figure 3:
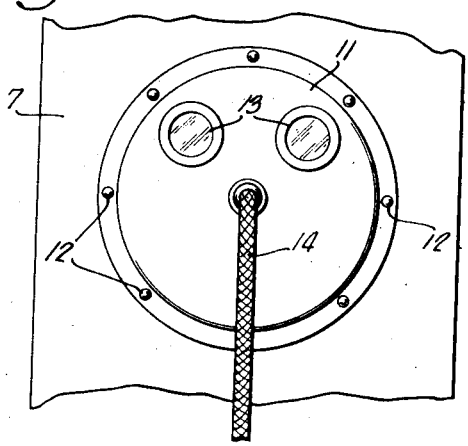
Fig. 3 is a face view of another form of the apparatus, which, in this instance, is constructed as an integral part of a craft or vehicle.
Figure 4:
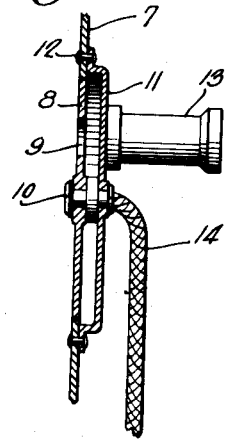
Fig. 4 is a detailed sectional view of the same apparatus.

In Figs. 3 and 4, there is illustrated a further embodiment of the invention, wherein the viewing device is built into or formed integral with the craft or vehicle. In these figures, a wall of the craft is shown at 7, and is provided with an aperture large enough to accommodate a disk 8 which may be approximately five inches in diameter, as previously mentioned. The disk 8 is provided with an aperture 9, and is mounted on a spindle 10 rotatably carried by a plate 11. The peripheral edge portion of plate 11 is flanged, and is secured to wall 7 about the aperture therein by means of fastening elements, such as rivets 12. The plate 11 is provided with two apertures spaced apart the normal distance between the eyes, and adjacent these apertures there are mounted on the plate a pair of eye-pieces 13. The disk 8 may be driven by a flexible shaft 14 actuated by a small motor (not shown).

When the disk 8 rotates, the opening 9 therein aligns successively with the eye-pieces 13, so that an observer within the craft or vehicle, upon placing his eyes adjacent the outer ends of the eye-pieces, views a distant object first with one eye and then with the other. The rotation of the disk at a speed such that complete viewings of the object are obtained at a frequency within the persistence of vision, together with the travel of the craft, results in greatly increased visual relief, as above explained. It is to be understood that the craft or vehicle is traveling in a direction other than directly toward the object being viewed.

It will be noted that the eye-pieces 13 are only about 90° apart with respect to the center of the disk. For a given speed of the craft, this will decrease the perspective, since obviously the craft will travel a shorter distance between the successive viewings by the eyes. Consequently, it is preferred to have the eyes of the observer 180° apart with respect to the center of the disk.

If desired, more than one opening may be provided in the disk, which will enable a reduction in the speed of the disk. For example, if two apertures are provided, the speed of the disk may be reduced to 8 revolutions per second, since two complete viewings of the object will take place during each revolution.

In any case where an optical viewing system is employed, known means may be employed to magnify the image thus enhancing the results obtained. Thus in the embodiments illustrated, the eye-pieces may be equipped with lenses for this purpose.

It will be apparent that the invention may be practiced by using other forms of apparatus. For example, shutters may be placed in front of the eyes of the observer and may be aperated in a manner to effect alternate and successive viewings by the eyes at a rate or frequency within the persistence of vision.

It will be understood, therefore, that the invention is not limited to the specific forms illustrated, but is capable of further embodiments and modifications within its scope.

I claim:

1. A method of obtaining increased third-dimensional viewing of a distant object by an observer on a craft or vehicle proceeding on a line of travel disposed at an angle to the line of vision between said observer and said object, which consists in presenting alternately and successively to the eyes of said observer views of the object at a frequency within the persistence of vision of the human eyes, whereby due to the travel of the craft the observer's eyes view the object successively from points of observation spaced a distance apart substantially greater than the normal distance between the human eyes.

2. A method of obtaining increased third-dimensional viewing of a distant object by an observer on a craft or vehicle proceeding on a line of travel disposed at an angle to the line of vision between said observer and said object, which consists in rendering an object visible alternately and successively to the eyes of said observer at a frequency within the persistence of vision of the human eyes, whereby due to the travel of the craft the observer's eyes view the object successively from points of observation spaced a distance apart substantially greater than the normal distance between the human eyes.

3. A method of obtaining increased third-dimensional viewing of a distant object by an observer on a craft or vehicle proceeding on a line of travel disposed at an angle to the line of vision between said observer and said object, which consists in screening the eyes of said observer and unscreening said eyes alternately and successively at a frequency within the persistence of vision of the human eyes, whereby due to the travel of the craft the observer's eyes view the object successively from points of observation spaced a distance apart substantially greater than the normal distance between the human eyes.

JOHN B. BARTOW.